United States Patent Office 3,419,097
Patented Dec. 31, 1968

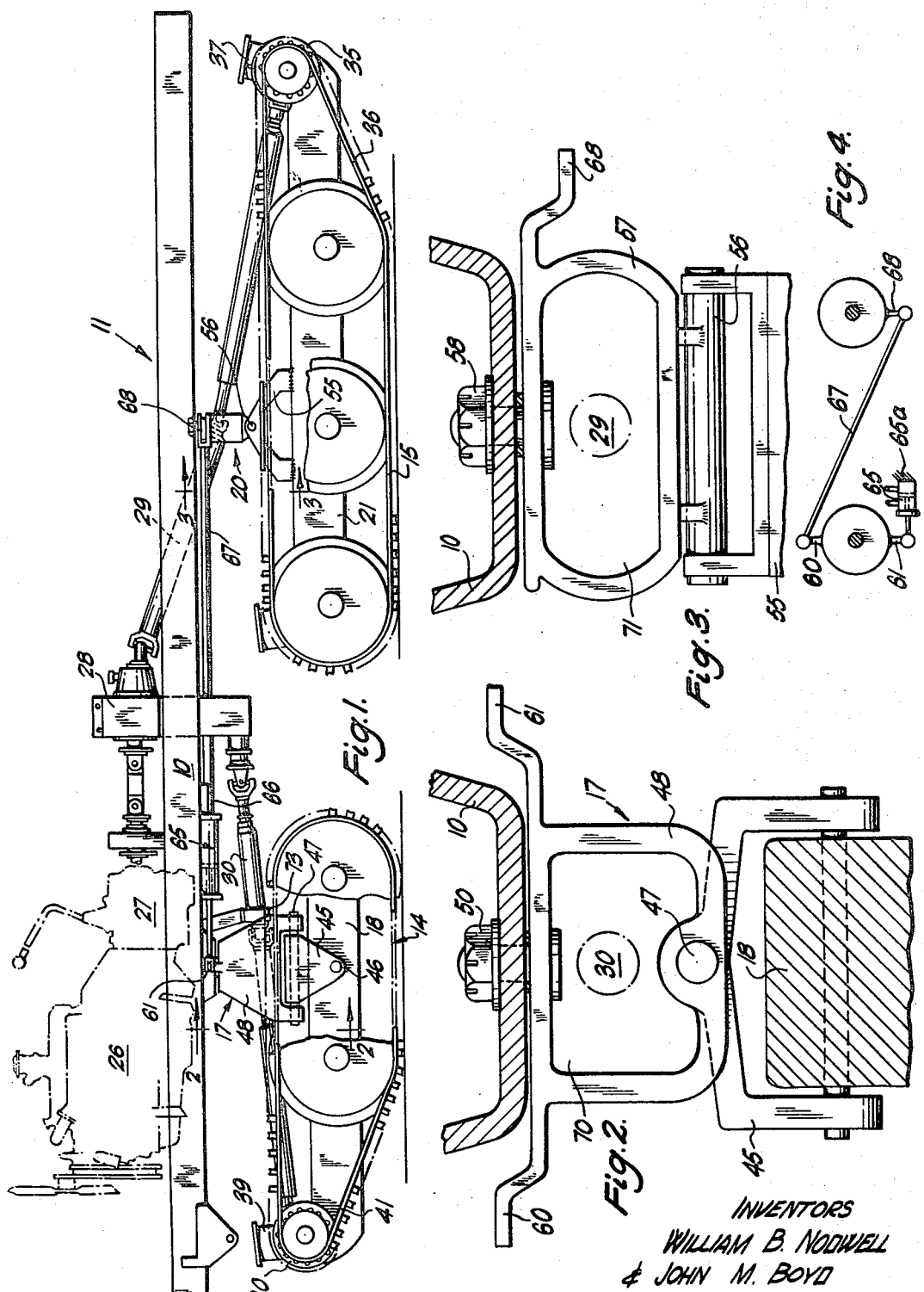

3,419,097
SINGLE FRAME TRACKED CARRIER
William Bruce Nodwell, R.R. 4, Banff Highway, and John Minto Boyd, 635 Sifton Blvd., both of Calgary, Alberta, Canada
Filed Mar. 21, 1966, Ser. No. 539,251
Claims priority, application Canada, Oct. 15, 1965, 943,038
5 Claims. (Cl. 180—9.46)

ABSTRACT OF THE DISCLOSURE

A single frame tracked carrier having front and rear track assemblies. The front track assembly is mounted on the frame by a connecting head providing freedom of movement about yaw, pitch and roll planes. The rear track assembly is mounted on the frame by a connecting head which provides freedom of movement in yaw and pitch planes only. A drive shaft is connected to each track assembly.

This invention relates to single frame tracked carriers of the type having front and rear track assemblies.

One of the advantages that a single frame tracked carrier has over the multi-frame tracked carrier concept is that the frame in the single frame configuration can be used efficiently as a torsion member to absorb the stresses applied to the frame by the individual motions of the front and rear track assemblies. An efficient utilization of such a frame has been proposed in a device where the individual tracks of the front track assembly have been separately mounted for movement in a pitch axis. The prior concept, however, suffers from the disadvantage that the tracks can be individually displaced relative to each other to such a degree that the carrier becomes unstable. The present invention seeks to utilize the advantages of the single frame and to avoid the disadvantages inherent in the individual mounting of the front tracks.

Accordingly the present invention provides a single frame tracked carrier having front and rear track assemblies; a load carrying head connecting the front track assembly to the frame with three degrees of freedom; and a load carrying head connecting the rear track assembly to the frame with freedom in the yaw and pitch planes.

According to a feature of the invention, the front track assembly has a forwardly ramped track means driven from sprocket means at the front of the front assembly, and the rear track assembly has a rearwardly ramped track means driven from sprocket means at the rear of the rear assembly.

According to a preferred feature of the invention, the load carrying heads connecting the front and rear track assemblies to the frame are provided with tunnels through which drive shafts pass to provide power to the front and rear assemblies.

In this fashion, the present invention provides on a carrier having the advantages of a single frame, the added advantage that regardless of whether the vehicle is going forwardly or in reverse, a ramped track is presented to the terrain. Furthermore, the fact that when the carrier is manoeuvring on hills, this form of drive provides loose tracks on the front assembly and tensioned tracks on the rear assembly, when climbing, and tension on the front tracks while the rear tracks are maintained relatively loose, during descent of the carrier downwardly.

The following is a description by way of example of the one embodiment of the present invention reference being had to the accompanying drawings in which:

FIGURE 1 is a sid elevation partly in section of the stripped skeleton of a single frame vehicle schematically showing the load carrying heads;

FIGURE 2 is a schematical detail looking in the direction of the arrows 2—2 on FIGURE 1;

FIGURE 3 is a schematic detail looking in the direction of the arrows 3—3 of FIGURE 1; and, FIGURE 4 is a schematic plane view of one suitable steering system.

Referring now to the drawings, 10 is a main frame of the single framed vehicle 11 having a front track assembly 14 and a rear track assembly 15. The front assembly 14 is connected with the frame 10 through a load carrying head 17 attached to the frame 10 on the one hand and to the front track assembly sub-frame 18 on the other hand and permitting three degrees of freedom between frame 10 and sub-frame 18. The rear track assembly 15 is connected by means of a load carrying head 20 attached to the frame 10 on the one hand and to the rear track assembly sub-frame 21 on the other hand, and permitting movement of the rear track sub-assembly relative to the frame 10, about both yaw and pitch planes.

Mounted on the frame 10 is an internal combustion engine 26 which drives through a standard transmission 27 and a transfer box 28 to drive a rear propeller shaft 29 and a front propeller shaft 30. Of course it is to be understood that any other suitable transmission could be used between the engine 26 and the propeller shafts 29, 30. The propeller shafts 29, 30 in turn drive a pair of rear sprockets through suitable gearing 37, and of which sprockets is shown at 35, to drive the rear tracks, one of which is shown at 36, of the rear track assembly while the propeller shaft 30 similarly drives, through gearing 39, front sprockets (one of which is shown at 40) mounted on the front sub-frame 18 to drive the front tracks (one of which is shown at 41) of the front track assembly.

The head 17 has a lower clevis 45, an intermediate tunnel-like member 48, the upper surface 49 of which forms a turntable bearing surface. The clevis 45 is attached by means of a pin 46 to the sub-frame 18. The intermediate tunnel-like member 48 is connected to the clevis 45 by means of a pin 47; and the turntable bearing surface is connected to the frame 10 by means of a king pin 50. The front track assembly 14 is therefore permitted three degrees of freedom relative to the frame 10; in pitch, about the pin 46; in roll, about the pin 47; and in yaw, about the king pin 50.

A bracket 55, FIGURES 1 and 3, on the rear sub-frame 21 connects it by means of a pin 56 to a tunnel-like member 57, the top surface of which is connected by means of a king pin 58 with the frame 10 forming a turntable bearing surface. This permits movement of the rear track assembly in pitch and yaw only, relative to the frame 10.

Attached to and extending sidewardly of the tunnel-like member 48 (FIGURES 2 and 4) are steering crank arms 60 and 61. A hydraulic piston and cylinder means 65 is anchored to the frame 10 and 65a and acts on the steering crank arm 61 to rotate the front head 17 and with it the front sub-frame 18. A cross link 67 connects the other steering crank arm 60 of the front head 17 with a steering crank arm 68 on the rear head 20. When hydraulic fluid is admitted to one side of the piston 65, the front track assembly 14 is rotated in a clockwise direction whilst the rear track assembly 15 is rotated in a counterclockwise direction by means of the cross link 67. When hydraulic fluid is admitted to the other side of the hydraulic piston, the front and rear track assemblies are rotated in the opposite sense. It is of course understood that any other suitable steering system could be used to accomplish the counter steering requirements for the front track assembly 14 and the rear track assembly 15.

Both the tunnel-like members 48 and 57 provide tunnels 70 and 71 through which the propeller shafts 30 and 29 respectively pass, in order to transmit the drive to the sprockets 35 and 40 from the transfer box 28. These tunnels 70 and 71 permit the propeller shafts 30 and 29 to function to transmit the drive without interference with the front and rear heads 17 and 20 respectively, during the operational movements of front and rear track assemblies 14 and 15.

It is a preferred feature of the present invention that on the front load carrying head 17 that the pins 46, 47 and 50 be substantially arranged along a vertical straight line and that the universal joint 73, which for the sake of clarity in FIGURE 1, is shown to the right of the head 17, be substantially aligned on this vertical line. Similarly, with the rear head, the pins 56 and 58 and a universal joint (not shown) are all arranged substantially on the vertical axis of the rear head 20. With such a configuration, propeller shaft joint motion is maintained at an efficiently low level. It will be understood, that when required, constant velocity joints may be used in place of the aforementioned universal joints.

What we claim as our invention is:

1. A single rigid main frame tracked carrier having:
    (i) a front track assembly sub-frame with two tracks mounted for tractional movement thereon and for common movement therewith;
    (ii) a front load carrying head connecting the front track assembly sub-frame to said main frame;
        (a) first front articulating means on the front load carrying head to provide for movement of the sub-frame about a pitch axis relative to the main frame;
        (b) second front articulating means on the front load carrying head to provide for movement of the sub-frame about a yaw axis relative to the main frame; and
        (c) third from articulating means on the front load carrying head to provide for movement of the sub-frame about a roll axis relative to the main frame;
    (iii) a rear track assembly sub-frame having two tracks mounted for tractional movement thereon and for common movement therewith;
    (iv) a rear load carrying head connecting the rear track assembly sub-frame to the main frame;
        (a) first rear articulating means on the rear load carrying head to provide for movement of the rear track assembly sub-frame about a pitch axis relative to the main frame; and
        (b) second rear articulating means on the rear load carrying head to provide for movement of the rear sub-frame about a yaw axis relative to the main frame;
        (c) said rear track assembly sub-frame being restrained from movement about a roll axis relative to the main frame;
    (v) a prime mover mounted on said main frame;
    (vi) driving connections from said prime mover to said front and rear track assemblies; and
    (vii) steering means connected to, and acting on, said load carrying heads to concurrently steer the front and rear track assemblies.

2. A single main frame tracked carrier as claimed in claim 1 in which the two tracks on the front track assembly are forwardly ramped and driven from sprocket means at the front of said front track assembly sub-frame and in which the two tracks on the rear track assembly are rearwardly ramped and driven from sprocket means at the rear of the rear track assembly sub-frame.

3. Apparatus as claimed in claim 1 in which the second front articulating means includes a pair of widely spaced apart side walls connected by spaced top and bottom walls said walls defining a throughway to accommodate the passage of a drive shaft forming part of said driving connections and permitting of relative yaw movement between front track assembly sub-frame and drive shaft.

4. A single rigid main frame tracked carrier having:
    (i) a front track assembly sub-frame with two tracks mounted for tractional movement thereon and for common movement therewith;
    (ii) a front load carrying head upstanding from the front track assembly sub-frame and connecting it to the main frame;
        (a) first front articulating means on the front load carrying head to provide for movement of the sub-frame about a pitch axis relative to the main frame;
        (b) second front articulating means on the front load carrying head to provide for movement of the sub-frame about a yaw axis relative to the main frame; and
        (c) third front articulating means on the front load carrying head to provide for movement of the sub-frame about a roll axis relative to the main frame;
            said first, second and third front articulating means being substantially arranged along a vertical straight line;
    (iii) a rear track assembly sub-frame having two tracks mounted for tractional movement thereon and for common movement therewith;
    (iv) a rear load carrying head upstanding from the rear track assembly sub-frame and connecting it to the main frame;
        (a) first rear articulating means on the rear load carrying head to provide for movement of the rear track assembly sub-frame about a pitch axis relative to the main frame; and
        (b) second rear articulating means on the rear load carrying head to provide for movement of the rear sub-frame about a yaw axis relative to the main frame;
            said first and second rear articulating means being substantially arranged on a vertical straight line;
        (c) said rear track assembly sub-frame being restrained from movement about a roll axis relative to the main frame;
    (v) a prime mover mounted on the main frame;
    (vi) driving connections from said prime mover to said front and rear track assemblies; and
    (vii) steering means connected to, and acting on, said load carrying heads to concurrently steer the front and rear track assemblies.

5. Apparatus as claimed in claim 4 in which said steering means acts upon said second front and said second rear articulating means of said load carrying heads to provide for said concurrent steering.

References Cited

UNITED STATES PATENTS

| | | | |
|---|---|---|---|
| 2,180,048 | 11/1939 | Gurton | 180—14 |
| 2,598,863 | 6/1952 | Tucker | 180—5 |
| 2,933,143 | 4/1960 | Robinson | 180—14 |
| 3,023,826 | 3/1962 | Larson | 180—15 |
| 3,265,146 | 8/1966 | Tucker | 180—9.46 |

FOREIGN PATENTS 537,619  6/1941  Great Britain.

OTHER REFERENCES

Tucker, Sno-Cat, series 400-4, heavy duty, published July 1964 by Tucker Corp., Medford, Oreg.

Steering of Tracked Vehicles by Articulation, June 1961, Wilson, Nuttal, Raimond Eng. Inc., Chestertown, Md., pp. 1-6.

Design News Magazine, p. 40, May 12, 1958, published by Rogers Publishing Co., Englewood, Colo.

RICHARD J. JOHNSON, *Primary Examiner.*

U.S. Cl. X.R.

180—50